J. PENDLEBURY & J. HEATLEY.
POTATO GRADER.
APPLICATION FILED MAR. 27, 1916.
1,215,846.
Patented Feb. 13, 1917.
2 SHEETS—SHEET 1.
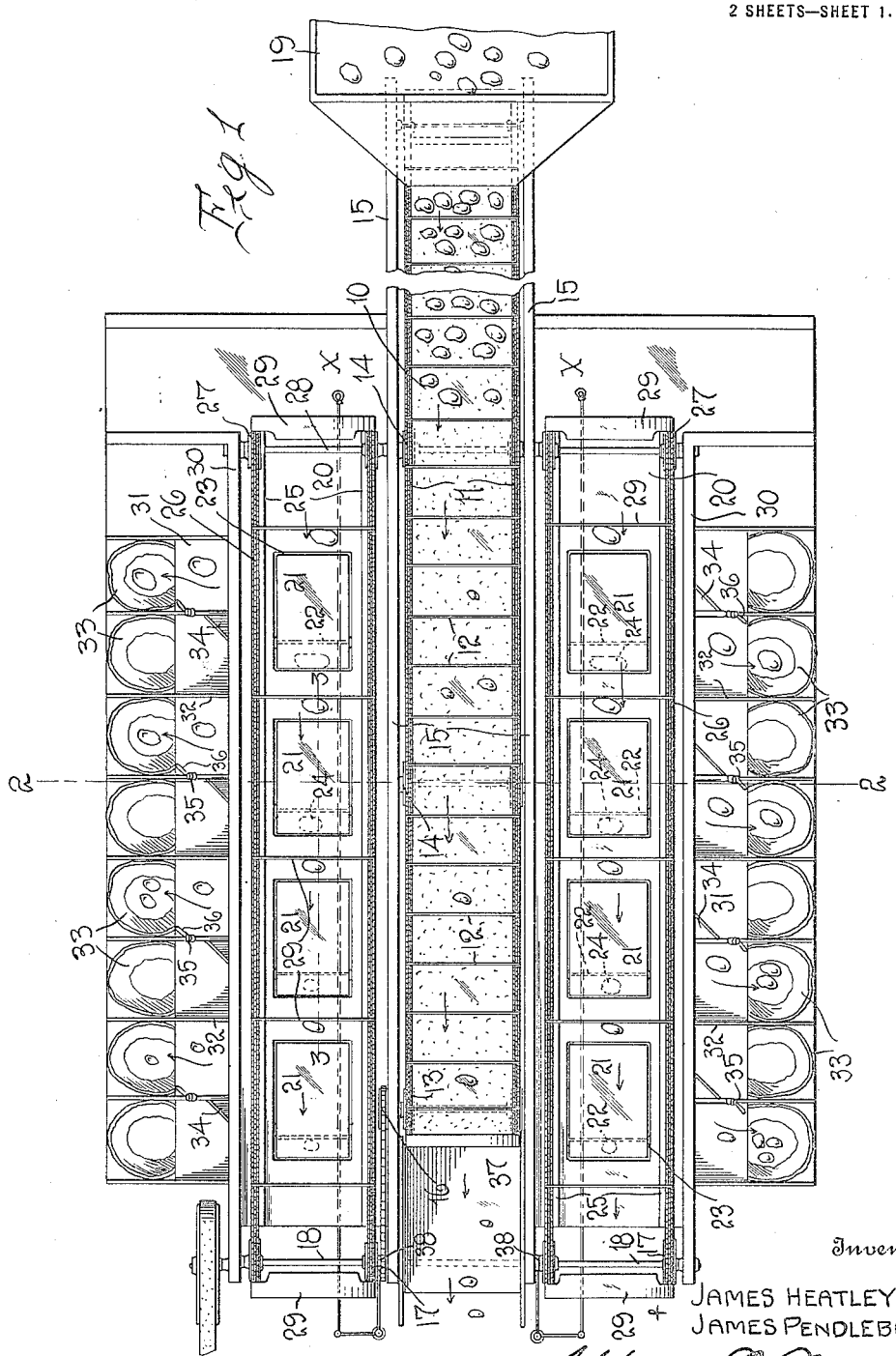
Inventors
JAMES HEATLEY
JAMES PENDLEBURY
By Watson E. Coleman
Attorney

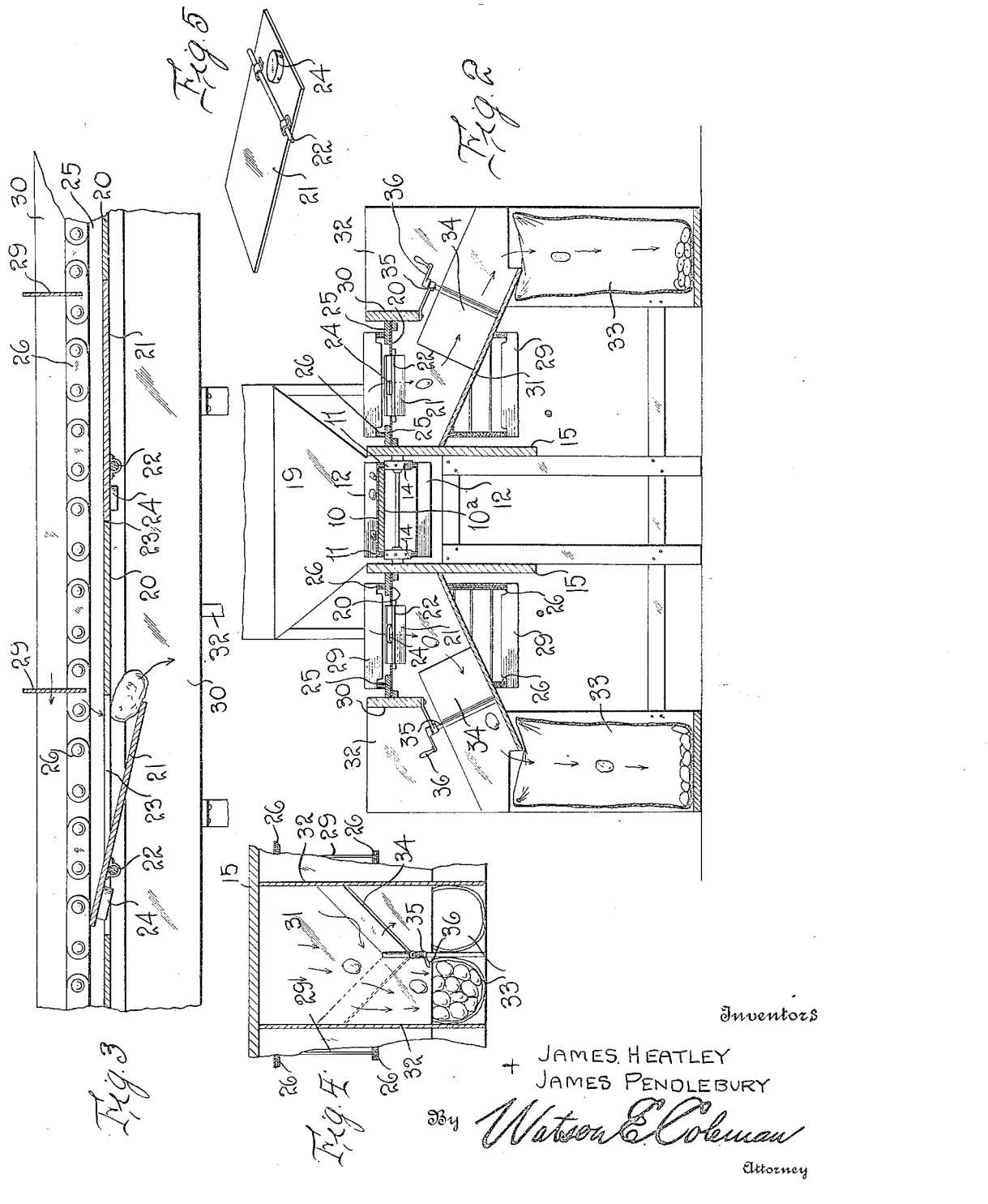

UNITED STATES PATENT OFFICE.

JAMES PENDLEBURY AND JAMES HEATLEY, OF BLACKFOOT, IDAHO.

POTATO-GRADER.

1,215,846.

Specification of Letters Patent.

Patented Feb. 13, 1917.

Application filed March 27, 1916. Serial No. 87,048.

*To all whom it may concern:*

Be it known that we, JAMES PENDLEBURY and JAMES HEATLEY, citizens of the United States, residing at Blackfoot, in the county of Bingham and State of Idaho, have invented certain new and useful Improvements in Potato-Graders, of which the following is a specification, reference being had to the accompanying drawings.

This invention relates to grading and sorting machines, and particularly to machines for grading or sorting potatoes.

The general object of our invention is to provide a simple, readily operated, and effective machine of this character, wherein the potatoes shall be graded by weight, and still another object is to provide a device of this character in which the potatoes, after being picked so as to separate the good potatoes from the culls, are carried over a series of trap doors, these trap doors being differently weighted so that the heaviest potatoes will drop through a certain door, the next heaviest through another door, and so on.

Still another object is to provide means whereby two sacks may be supported in connection with each grading chute and the potatoes may be directed into one sack until that sack is filled and then directed into the other sack while a new sack is being disposed in connection with the chute.

A further object of the invention is the provision of a machine in which the potatoes are carried from a suitable container or hopper to a position convenient to the operators who separate the good potatoes from the culls and in which the culls are carried along the machine and eventually discharged while the commercially good potatoes are discharged upon the sorting conveyers or carriers, as will be later described.

A further object is to provide a machine of this character which will be more certain in its action than the potato graders now in use, which may be effectively controlled by a few operators, and which may be operated at a relatively small expense and power.

Other objects will appear in the course of the following description.

Our invention is illustrated in the accompanying drawings, wherein:

Figure 1 is a plan view of a potato grader constructed in accordance with our invention;

Fig. 2 is a transverse section on the line 2—2 of Fig. 1;

Fig. 3 is an enlarged longitudinal section on the line 3—3 of Fig. 1;

Fig. 4 is a top plan view showing the manner in which the potatoes are directed into one sack or another, certain of the parts being shown in section; and Fig. 5 is a perspective view of one of the trap doors looking toward the under side.

Referring to the drawings, and particularly to Figs. 1 and 2, it will be seen that we have provided a medially disposed conveyer 10 carried by oppositely disposed parallel sprocket chains 11 and operating over a table 10$^a$, if desired, the conveyer being made of canvas or any other suitable material and having transversely extending strips 12 extending between the chains so as to cause the potatoes to be carried along with the conveyer. This conveyer is operatively supported upon suitable sprocket wheels 13 and 14 mounted upon shafts in turn supported in the longitudinal frame members 15. These shafts may be driven in any suitable manner and we have shown the conveyer as being driven by means of the sprocket wheel 16. This wheel is connected to a driving sprocket wheel 17 in turn mounted upon a driving shaft 18 which is driven by any suitable power. The conveyer 10 extends to any suitable point and receives potatoes from a hopper or container 19. The conveyer 10 either lifts the potatoes from a lower level to a higher level or may receive the potatoes at a higher level and carry them to a lower level, whichever is most convenient for the operators.

Disposed on each side of the conveyer 10 are the tables 20 which are formed at a plurality of points along their length with trap doors 21. Each of these doors has the form shown in Fig. 5, and each door is pivotally mounted adjacent one end as by a shaft 22. Each shaft extends into the walls of the trap door opening 23, and each door is weighted at its short end by a weight 24. These weights vary in size. Thus the first door of the series has a relatively heavy weight supporting it against depression. The next door of the series has a relatively lighter weight, the next door a still lighter weight, and in the last door the counterweight is relatively small. We have also illustrated the shafts 22 as being disposed at different distances from the butt end of the doors, as by this means the doors may be differently counterweighted. Disposed along each side of the table 20 is a ledge 25, and operating along these oppositely disposed parallel ledges are the sprocket chains 26 which pass over sprocket wheels 27 on the shafts 28 and 18, the upper flight of the chains passing over the upper faces of the ledges 25, the lower flight of the chains hanging downward beneath the table 20 as is most clearly illustrated in Fig. 2, these chains 26 carrying the transversely extending blades 29 which move over the table 20 in proximity thereto and which engage the potatoes and carry the potatoes along over the table. The table is bounded on one side by the wall 15 and on the other side by the wall 30, as best seen in Fig. 2.

Disposed below each table 20 is a downwardly and outwardly inclined board 31 which is divided into a series of compartments by transversely extending partitions 32, the space between each two partitions constituting a chute and this space being disposed immediately beneath one of the trap doors. The distance between the partition walls 32 is equal to the diameter of two potato sacks 33, as shown in Fig. 4, and disposed between these partitions 32 is a deflector 34 which is pivoted between the partitions 32 so that the deflector may be shifted into engagement with one or the other of said partitions and thus act to deflect the potatoes into one or the other bag 22. This partition may be shifted in any suitable manner, but we have illustrated it as having a shaft 35 provided with a handle 36 (see Fig. 2). Thus as soon as one bag 33 is filled the deflector 34 may be shifted so as to direct the potatoes into the unfilled sack, as illustrated most clearly in dotted lines in Fig. 4. Meanwhile the filled sack may be removed and an unfilled sack substituted therefor.

In practical use the two operators stand at the point X—X where it is convenient to the carrier 10 and also convenient to the adjacent ends of the table 20. As the potatoes are carried past the operators by the carrier, the operators pick the good potatoes from the culls and place the good potatoes beneath the tables 20. The culls pass on along with the carrier and are discharged upon the chute 37. Meanwhile the blades 29 sweep the good potatoes along the tables 20. All of the potatoes except the heaviest pass over the first trap doors 21. The heaviest potatoes, however, will depress these doors and drop down into the proper sack. The next heaviest potatoes will depress the next doors 21, while the lighter potatoes will pass onward to the third set of doors, and if they are sufficiently light to a fourth set of doors. Of course, while we have only shown four doors to each of the tables 20, we wish it understood that, if necessary, a greater number of grading trap doors may be provided, or a less number.

In the practical use of the invention the first door of each table 20 will drop potatoes weighing one pound and over, that is, the largest potatoes. The second door will descend to potatoes having a weight of twelve ounces and over, up to a pound, that is the second largest potatoes. Each door drops potatoes four ounces lighter than the preceding trap door. The culls and extra small potatoes which have been placed upon the tables 20 pass on to the chute or table 37. One man stands at the forward end of each table 20 on each side of the middle carrier 10 so as to feed the side tables from the middle carrier. The actuating means for this middle carrier may be provided with clutches whereby it may be immediately stopped at will without affecting the movement of the chains 26 on the tables 20. We have illustrated such a clutch, designated 38, but do not wish to be limited to the use of this clutch nor to the particular form of clutch or operating means. The tables 20 will be approximately eight feet in length and about forty inches wide, and the carrier 10 will be from twelve to fourteen feet long and about fourteen inches wide.

It is to be noted that the trap doors 21 extend parallel to the line of movement of the carrier chains 26 and that the pivotal axis 22 of each trap door is disposed forward of the weighted or rear end of the trap door. It will be seen from Fig. 3 that when the trap door falls under the weight of a potato, the rear end of the trap door will rise. Now if the weight 24 is not sufficient to return the trap door to its horizontal position, as for instance, if the trap door should stick, the next following transverse member 29 will engage the rear end of the trap door and positively close it. By arranging the trap doors so that they move in the plane of movement of the carrier, there is no danger of the trap doors moving to a position where they would prevent the movement of the transverse members 29. It is obvious that if the trap doors rotate at right angles to the movement of the carrier chains 26 and the trap door did not, for any reason, swing back to its closed position, a blade 29 would engage with the edge of the trap door and the trap door would either be broken or the blade would be broken or the mechanism would come to a stop.

We do not wish to be limited to any of the details of construction illustrated as it is obvious that the details may be changed without departing at all from the spirit of the invention. The mechanism may be modified in many ways to suit the exigencies of any particular circumstance, and it is obvious that the device may be modified so as to suit it for sorting or grading other kinds of fruits or vegetables than potatoes.

Having described the invention, what we claim is:

Means for assorting articles by weight including a table provided with a plurality of discharge openings, counterweighted trap doors arranged in said openings, the counterweights on the doors being successively lighter from the forward end to the rear end of the machine, said trap doors being each pivoted on an axis extending transversely of the machine whereby the trap doors move in planes parallel to the length of the machine, and each axis being disposed forward of the rear end of the corresponding door whereby the rear end of the door will project upward when the forward end of the door is depressed, and a carrier traveling over the table and including transverse members adapted to engage the rear end of each door and positively shift it toward its closed position.

In testimony whereof we hereunto affix our signatures in the presence of two witnesses.

JAMES PENDLEBURY.
JAMES HEATLEY.

Witnesses:
A. S. DICKINSON,
W. H. STUFFLEBEAM.